O. MUELLER.
CULTIVATOR.
APPLICATION FILED DEC. 13, 1913.
1,180,178.
Patented Apr. 18, 1916.
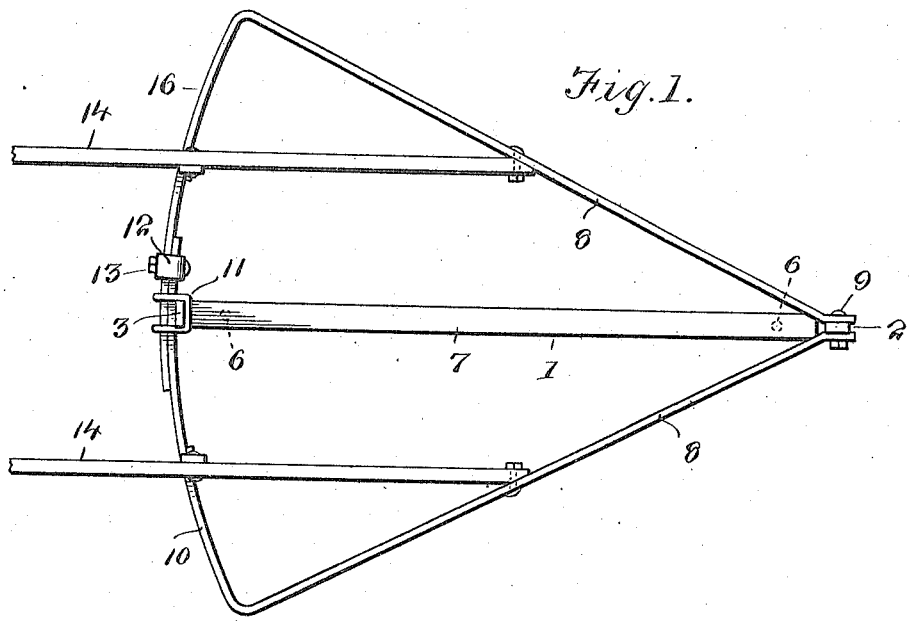
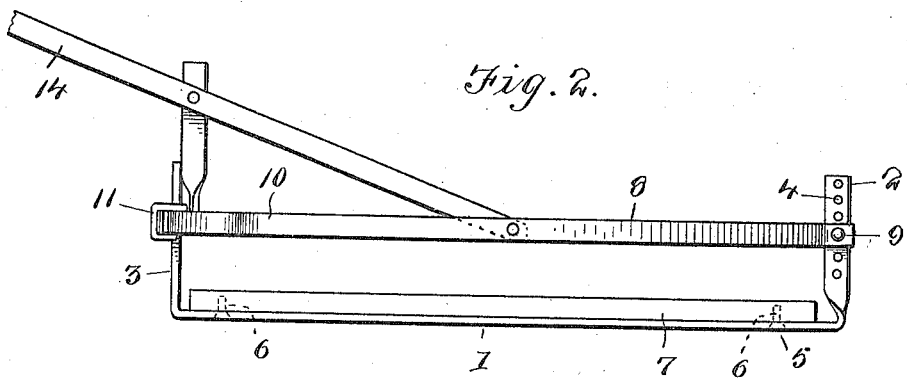
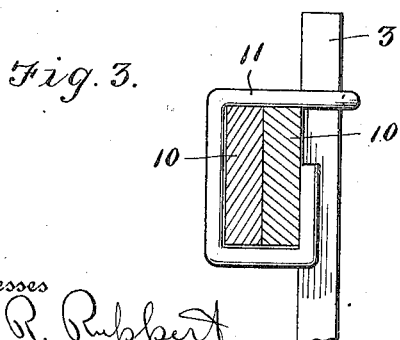
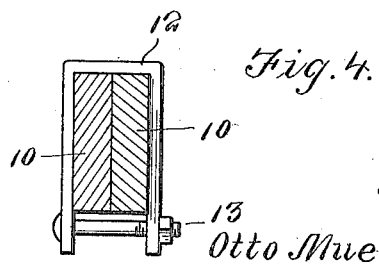
Witnesses
E. R. Ruppert
H. Peacock
Inventor
Otto Mueller
By Victor J. Evans
Attorney
THE COLUMBIA PLANOGRAPH CO., WASHINGTON, D. C.

UNITED STATES PATENT OFFICE.

OTTO MUELLER, OF ELKTON, FLORIDA.

CULTIVATOR.

1,180,178.

Specification of Letters Patent. Patented Apr. 18, 1916.

Application filed December 13, 1913. Serial No. 806,613.

*To all whom it may concern:*

Be it known that I, OTTO MUELLER, a citizen of the United States, residing at Elkton, in the county of St. John and State of Florida, have invented new and useful Improvements in Cultivators, of which the following is a specification.

This invention relates to cultivators and it consists in the novel features hereinafter described and claimed.

An object of the invention is to provide a cultivator of simple and durable structure which may be readily and conveniently used for cultivating growing crops, to remove weeds and grass from between the rows of the plants of the crop and to shape the ridges of soil in which the said plants stand.

With the above object in view the cultivator comprises a keel member having upstanding ends. Wing members are secured at their forward ends to the forward upstanding portion of the keel member and the said wing members are provided at their rear ends with arcuate sections adapted to overlap each other at their inner ends. Means is provided for loosely connecting the overlapping portions of the said sections with the upstanding rear extremity of the keel member and means is provided for clamping the overlapping sections of the wings together. Handles are mounted upon the wings and the sections thereof.

In the accompanying drawings:—Figure 1 is a top plan view of the cultivator. Fig. 2 is a side elevation of the same. Figs. 3 and 4 are detailed views of the several features thereof.

The cultivator comprises a keel member 1 which is preferably formed from a strip of metal and which is provided at its forward end with an upstanding extremity 2 and at its rear end with an upstanding extremity 3. The extremity 2 is provided with a series of perforations 4 with any one of which a draft clevis (not shown) may be connected. The intermediate portion of the keel member 1 is provided in the vicinity of its forward and rear ends with perforations 5 and bolts 6 are countersunk at their heads in the said perforations and secure a block 7 upon the upper surface of the intermediate portion of the keel member 1 whereby sufficient weight is added to the said keel member to hold the same in proper position upon the soil when the cultivator is in use.

Wing members 8 are pivotally and adjustably connected with the upstanding extremity 2 at the forward end of the keel 1 by means of a bolt 9 which passes transversely through the forward end portions of the said wing members and through one of the perforations 4. The wing members 8 are provided at their rear ends with arcuate sections 10 which overlap each other at their inner end portions. A clip 11 loosely receives the overlapping end portions of the arcuate sections 10 and also loosely receives the upper portion of the extremity 3 of the keel 1. A U-shaped clamp member 12 is applied to the overlapping portions of the arcuate sections 10 and a bolt 13 passes through the end portions of the said clamp member and when drawn tight serves to clamp or secure the arcuate sections 10 together. Thus it will be seen that when the bolt 13 is loosened the rear portions of the wing members 8 may be moved toward or away from each other and when at desired distances apart the said wing members will be held at the adjusted positions by tightening the bolt 13. At all times the rear portions of the wing members 8 are free to swing vertically with relation to the upstanding extremity 3 of the keel 1 for the reason that the clip 11 loosely receives the said extremity. Handles 14 are secured at their forward ends to the intermediate portions of the wing members 8 and braces 15 connect the intermediate portions of the said handles with the intermediate portions of the arcuate sections 10.

In operation the cultivator is drawn between two adjacent rows of plants and the intermediate portion of the keel member 1 travels along the bottom of the furrow between the rows of plants. The block 7 adds sufficient weight to the keel member to hold the same in position during its movement along the surface of the soil. The operator by using the handles 14 may swing the rear portions of the wing members 8 vertically so that the said wing members can encounter the soil at the sides of the ridges and cut out the weeds and grasses and cast sufficient soil toward the stalks of the standing plants.

If desired blades or scrapers (not shown) may be applied to the wing members 8 to facilitate the casting of the soil and cutting out of the weeds as above described.

Therefore it will be seen that a cultivator of simple structural arrangement is provided and that the parts may be easily and readily manipulated while in operation.

Having described the invention what is claimed is:—

A cultivator comprising a keel member having upstanding ends, wing members pivotally secured to the forward upstanding end of the keel member and having arcuate sections which overlap each other and adjustable longitudinally with relation to each other, means for securing said arcuate sections at adjusted positions with relation to each other, a clip loosely applied to the arcuate sections and loosely receiving the rear upstanding end of the keel member whereby the overlapping arcuate sections may move freely along the rear upstanding end of the keel member, and handles mounted on the wing members.

In testimony whereof I affix my signature in presence of two witnesses.

OTTO MUELLER.

Witnesses:
 GEO. W. SCOVILLE,
 WM. H. SCOVILLE.

Copies of this patent may be obtained for five cents each, by addressing the "Commissioner of Patents, Washington, D. C."